(12) United States Patent
Leclerc

(10) Patent No.: US 6,239,890 B1
(45) Date of Patent: May 29, 2001

(54) REPAIRING UNDERSEA OPTICAL FIBER TRANSMISSION SYSTEMS USING SOLITON SIGNALS WITH WAVELENGTH DIVISION MULTIPLEXING

(75) Inventor: Olivier Leclerc, St Michel sur Orge (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/172,854

(22) Filed: Oct. 15, 1998

(30) Foreign Application Priority Data

Oct. 16, 1997 (FR) .................................................. 97 12984

(51) Int. Cl.$^7$ .................................................. H04J 14/02
(52) U.S. Cl. .................. 359/124; 359/110; 359/127; 359/161; 359/173; 359/179
(58) Field of Search .................................................. 359/124, 161, 359/110, 173, 127, 179

(56) References Cited

U.S. PATENT DOCUMENTS

| | | | |
|---|---|---|---|
| 5,027,079 | * 6/1991 | Desurvire et al. | 330/4.3 |
| 5,502,588 | * 3/1996 | Abram | 359/154 |
| 5,546,210 | * 8/1996 | Chraplyvy et al. | 359/124 |
| 5,608,560 | * 3/1997 | Abram et al. | 359/156 |
| 5,625,479 | * 4/1997 | Suzuki et al. | 359/135 |
| 5,801,862 | * 9/1998 | Desurvire et al. | 359/124 |
| 5,875,045 | * 2/1999 | Sugiyama et al. | 359/124 |
| 5,903,368 | * 5/1999 | Desurvire et al. | 359/115 |
| 5,978,122 | * 11/1999 | Kawazawa et al. | 359/179 |
| 5,995,694 | * 11/1999 | Akasaka et al. | 385/123 |
| 6,097,524 | * 8/2000 | Doran et al. | 359/179 |

FOREIGN PATENT DOCUMENTS 0 786 877 A1  7/1997 (EP) .

OTHER PUBLICATIONS

Leclerc et al., "Investigation into the robustness of 100 Gbit/s (5×20 Gbit/s) regenerated WDM soliton transoceanic transmission to line brakes and repairs", Electronics Letters, vol. 33, No. 18, Aug. 28, 1997, Stevenage, GB pp. 1568–1570.

F. Pitel et al, "Experimental Assessment of Wavelength Margin in 20 Gbit/s WDM Soliton System over 18mm Distance", Electronics Letters, vol. 32, No. 21, Oct. 10, 1996, pp. 1957–1959.

\* cited by examiner

Primary Examiner—Leslie Pascal
Assistant Examiner—Hanh Phan
(74) Attorney, Agent, or Firm—Sughrue, Mion, Zinn, Macpeak & Seas, PLLC

(57) ABSTRACT

The invention provides a method of repairing an optical fiber transmission system using soliton signals and wavelength division multiplexing, in which the various wavelengths, $\lambda_1$ to $\lambda_n$, of the multiplex are selected to ensure that over a given interval $Z_R$, the relative slip between the various channels is substantially equal to a multiple of the bit time, the method comprising the following steps:

inserting an additional length of optical fiber in the transmission system; and compensating for the effects of said additional length on the relative slip between the various channels of the multiplex.

The invention also provides apparatus for repairing such an optical fiber transmission system using solution signals with wavelength division multiplexing. The invention prevents relative slip between the channels due to inserting an additional length of fiber into the transmission system.

22 Claims, 1 Drawing Sheet

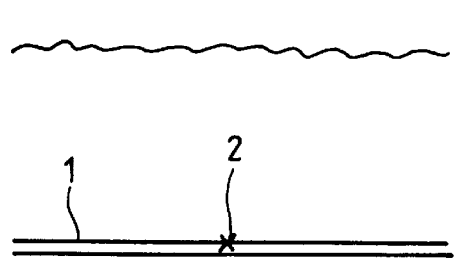
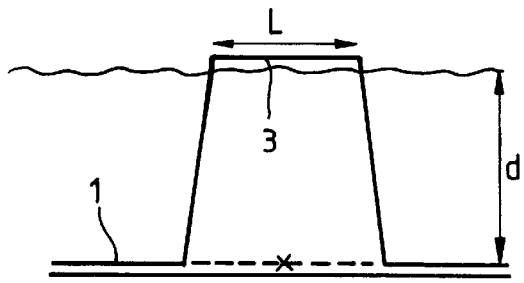
FIG_1  FIG_2
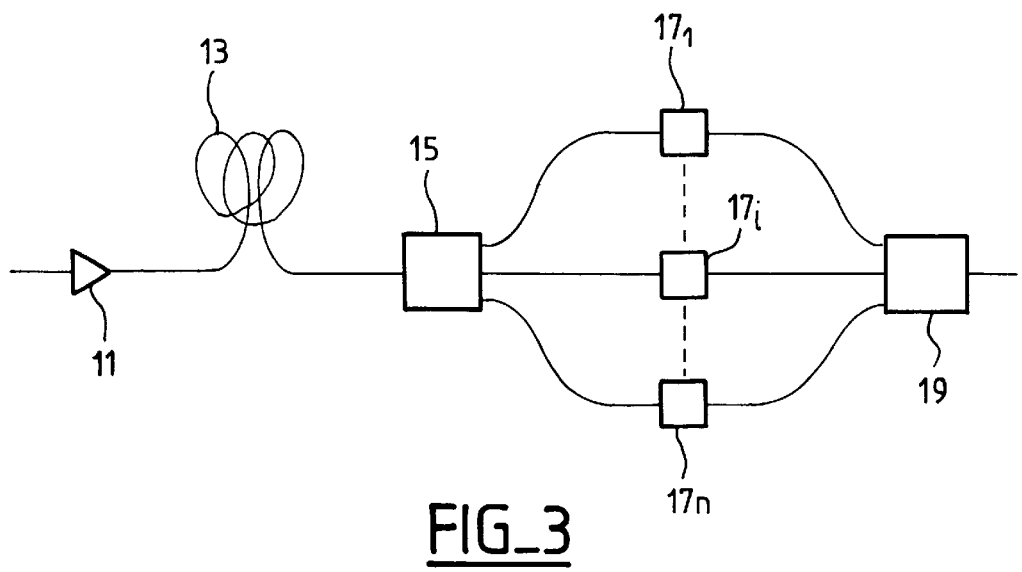
FIG_3

REPAIRING UNDERSEA OPTICAL FIBER TRANSMISSION SYSTEMS USING SOLITON SIGNALS WITH WAVELENGTH DIVISION MULTIPLEXING

FIELD OF THE INVENTION

The present invention relates to a method of repairing an undersea optical fiber transmission system using soliton signals with wavelength division multiplexing, and in which the various wavelengths of the multiplex are selected so as to ensure that over a given interval the relative slip between the various channels is substantially equal to a multiple of the bit time.

The invention also relates to apparatus for repairing such a transmission system.

BACKGROUND OF THE INVENTION

The transmission of soliton pulses or "solitons" in the portion of an optical fiber that has abnormal dispersion is a known phenomenon. Solitons are pulse signals having a $sech^2$ waveform. With pulses of this form, the non-linearity in the corresponding portion of the fiber compensates dispersion of the optical signal. Soliton transmission is modelled in known manner by the non-linear Schordinger equation.

Various effects limit the transmission of such pulses, such as the jitter induced by the solitons interacting with the noise present in the transmission system, as described for example in the article by J. P. Gordon and H. A. Haus published in Optical Letters, Vol. 11, No. 10, pp. 665–667. This effect which is known as the "Gordon-Haus effect" or as "Gordon-Haus jitter" puts a theoretical limit on the quality or the bit rate of transmission by means of solitons.

To be able to overcome that limit, it is possible to use synchronous modulation of soliton signals with the help of semiconductor modulators. That technique intrinsically limits the bit rate of the soliton link because of the upper limit on the passband of a semiconductor modulator. Proposals have also been made for systems using sliding guiding filters that make it possible to control the jitter of transmitted solitons, see for example EP-A-0 576 208. Proposals have also been made, for the purpose of regenerating the line signal, to use the Kerr effect in synchronous amplitude or phase modulators. Finally, proposals have been made to regenerate soliton signals by using saturable absorbers.

Another proposal for increasing the bit rate of optical fiber transmission systems using soliton signals is to use wavelength division multiplexing (WDM). Under such circumstances, it is considered advantageous to use sliding guiding filters of the Fabry-Perot type, which filters are entirely compatible with wavelength division multiplexed signals. In contrast, the use of synchronous modulators or saturable absorbers for regenerating wavelength division multiplexed soliton signals is problematic because of the difference in group speeds between the signals in the various channels.

An article by E. Desurvire, O. Leclerc, and O. Audouin, published in Optics Letters, Vol. 21, No. 14, pp. 1026–1028, describes a wavelength allocation scheme which is compatible with the use of synchronous modulators. That article proposes allocating wavelengths to the various channels of the multiplex in such a manner that, for given intervals $Z_R$ between the repeaters, the signals on the various channels, or more exactly the bit times of the various channels in the multiplex, are substantially synchronized on arriving at the repeaters. This makes in-line synchronous modulation of all of the channels possible at given intervals with the help of discrete synchronous modulators. That technique of allocating multiplexed wavelengths is also described in French patent application 96/00732 file on Jan. 23, 1996 in the name of Alcatel Submarine Networks.

Another article by O. Leclerc, E. Desurvire, and O. Audouin, published in Optical Fiber Technology, 3, pp. 97–116 (1997) specifies that in such a wavelength allocation scheme, the bit times of subsets of the channels in the multiplex are synchronous at intervals that are submultiples of $Z_R$. That article consequently proposes regenerating subsets of the channels in the multiplex at shorter intervals. Those solutions make it possible to transmit solitons over long distances, e.g. over transoceanic distances.

Soliton signal transmission systems are particularly adapted to high data rate transmission over long distances; one of the applications of such transmission systems is thus transoceanic transmission where typical lengths are a few thousands of kilometers.

One of the problems of a transoceanic transmission system is physical breakage of the transmission system or damage in the transmission system that cannot be repaired remotely. In conventional manner, under such circumstances, the undersea cable is raised and the damaged section is replaced. That solution is common practice and it is shown by way of example in FIGS. 1 and 2. As shown in FIG. 1, the cable 1 lies on the ocean bottom and has a damaged section 2. This section can be damaged in any way that is unsuitable for being repaired remotely. Under such circumstances, as shown in FIG. 2, the cable is raised and the damaged section is replaced by means of a length L of replacement cable 3.

OBJECT AND SUMMARY OF THE INVENTION

The object of the invention is to provide a solution to the problem posed by that repair technique when applied to optical fiber transmission systems using soliton signals with wavelength division multiplexing in which the various wavelengths of the multiplex are selected so as to ensure that the relative slip between the various channels over a given interval is substantially equal to a multiple of the bit time. The conventional repair technique implies using a length of optical fiber that is longer than the damaged section of the transmission system. This can be seen clearly in FIG. 2 where an additional length of cable L needs to be installed because of the depth d of the ocean, given that the repair is carried out on the surface. Such an additional length of cable is of no consequence in a conventional transmission system and has not previously been seen as a possible source of difficultly. The extra length L is about 1.6 times the depth d, and the effects of such an additional length, which is of the order of a few kilometers, are well below the constraints put on conventional transmission systems. Nevertheless, for an optical fiber transmission system using soliton signals with wavelength division multiplexing, and in which the various wavelengths of the multiplex are selected to ensure that, over a given interval, the relative slip between the various channels is substantially equal to a multiple of the bit time, such an additional length of optical fiber can give rise to relative slip between the various channels such that the bit times are no longer exactly synchronous on arriving at a repeater. E. Desurvire et al. in Transoceanic regenerated soliton systems: Design for over 100 Gbit/s capacities, Suboptic '97, pp. 438–447 describes on page 442 the effect of a length of repair cable on the Q factors of the various channels of a soliton transmission system with wavelength division multiplexing. That article concludes that the effects of such an additional length of cable are absorbed after about 2 Mm of propagation. Those results cannot be transposed to breaks in the vicinity of the ends of the link, in particular because propagation over 2 Mm is required in order to achieve those results; the article therefore does not propose a solution which is applicable to breaks in the vicinity of the ends of a link. Furthermore, it is not necessarily always acceptable to have a penalty on the quality of the link at a given location, even if the penalty is local only.

The present invention proposes a solution to this problem which is original and simple. It makes it possible to avoid offsetting the channels and to maintain channel synchronism at the repeaters. It ensures that the quality of the link remains good over the entire length of the line. It applies to breaks at any point in the link.

The invention also provides a solution to the problem of losses in such an additional length of fiber. In the past, such losses were not perceived as being troublesome. Nevertheless, they can give difficulty in a soliton signal transmission system with wavelength division multiplexing insofar as losses can be greater for delay lines and multiplexer/demultiplexers than for the transmission fiber.

More precisely, the invention proposes a method of repairing an optical fiber transmission system using soliton signals and wavelength division multiplexing, in which the various wavelengths, $\lambda_1$ to $\lambda_n$, of the multiplex are selected to ensure that over a given interval $Z_R$, the relative slip between the various channels is substantially equal to a multiple of the bit time, the method comprising the following steps:

inserting an additional length of optical fiber in the transmission system; and compensating for the effects of said additional length on the relative slip between the various channels of the multiplex.

Advantageously, the compensation step comprises applying time delays, $\Delta\tau_1$ to $\Delta\tau_n$, to the various channels of the multiplex so that the slip of each channel of the multiplex relative to a reference channel is substantially equal to a multiple of the bit time.

In an embodiment, the compensation step comprises applying a zero time delay to a reference channel and in applying time delays, $\Delta\tau_1$ to $\Delta\tau_n$, to the other channels of the multiplex so that the slip of each of the other channels of the multiplex relative to the reference channel is substantially equal to zero or to the bit time.

When the transmission system is a transmission system with compensation slope dispersion, the reference channel is preferably selected in the middle of the wavelength spectrum of the multiplex. It is then advantageous to apply to each channel of wavelength shorter than that of the reference channel a time delay that is equal to the slip of the reference channel relative to said channel. The method preferably includes applying to each channel of wavelength longer than that of the reference channel a time delay equal to the difference between the bit time and the slip of said channel relative to the reference channel.

When the transmission system is a transmission system without compensation slope dispersion, the reference channel is preferably selected at the beginning of the wavelength spectrum of the multiplex. It is then advantageous to apply to each channel of wavelength longer than that of the reference channel a time delay equal to the difference between the bit time and the slip of said channel relative to the reference channel.

Preferably, said additional length of optical fiber is constituted by a dispersion-shifted optical fiber.

Advantageously, a step is provided of amplifying the signals of the multiplex.

In an embodiment, for each wavelength $\lambda_i$ of the multiplex, and for an interval $Z_R$, the difference $\delta\tau_i$ between the slip per unit length on channel i and on the first channel satisfies the following relationship:

$$(k_i \cdot T - T/4) < \delta\tau_i \cdot Z_R < (k_i \cdot T + T/4)$$

where $k_i$ is an integer depending on the channel.

The invention also provides apparatus for repairing an optical fiber transmission system using soliton signals with wavelength division multiplexing in which the various wavelengths, $\lambda_1$ to $\lambda_n$, of the multiplex are selected so as to ensure that the relative slip between the various channels over a given interval, $Z_R$, is substantially equal to a multiple of the bit time, the apparatus comprising:

an additional length of optical fiber in the transmission system; and means for compensating the effects of said additional length on the relative slip between the various channels of the multiplex.

Preferably, the compensation means comprise demultiplexing means, means for applying time delays $\Delta\tau_1$ to $\Delta\tau_n$ to the various channels of the multiplex, and remultiplexing means.

In an embodiment, the compensation means comprise means for applying time delays $\Delta\tau_1$ to $\Delta\tau_n$ to the various channels of the multiplex, said delays being selected so that the slip of each of the channels of the multiplex relative to a reference channel is substantially equal to a multiple of the bit time.

It is also possible to provide for the compensation means to comprise means for applying a zero delay to a reference channel and for applying time delays $\Delta\tau_1$ to $\Delta\tau_n$ to the other channels of the multiplex so that the slip of each of the other channels of the multiplex relative to the reference channel is substantially equal to zero or to the bit time.

The reference channel can be selected to be in the middle of the wavelength spectrum of the multiplex. Under such circumstances, the delay of each channel of wavelength shorter than that of the reference channel is preferably equal to the slip of the reference channel relative to said channel in the additional length of optical fiber. The delay of each channel of wavelength longer than that of the reference channel is then advantageously equal to the difference between the bit time and the slip of said channel relative to the reference channel in the additional length of optical fiber.

The reference channel may also be selected to be at the beginning of the wavelength spectrum of the multiplex. Under such circumstances, the delay of each channel of wavelength longer than that of the reference channel is preferably equal to the difference between the bit time and the slip of said channel relative to the reference channel in the additional length of optical fiber.

In an embodiment, said additional length of optical fiber is constituted by dispersion-shifted optical fiber.

It is also possible to provide means for amplifying the signals of the multiplex.

BRIEF DESCRIPTION OF THE DRAWINGS

Other characteristics and advantages of the invention appear on reading the following description of embodiments of the invention given by way of example and with reference to the accompanying drawings, in which:

FIG. 1 is a diagram of an undersea transmission system;

FIG. 2 is a diagram of a conventional technique for repairing the transmission system of FIG. 1; and FIG. 3 shows repair apparatus of the invention.

MORE DETAILED DESCRIPTION

The invention applies to an optical fiber transmission system using soliton signals with wavelength division multiplexing in which the various wavelengths of the multiplex are selected so as to ensure that over a given interval the relative slip between the different channels is substantially equal to a multiple of the bit time. For that purpose, it is possible to use the wavelength allocation schemes of the above-mentioned articles by E. Desurvire and O. Leclerc. Those articles are incorporated by reference into the present description insofar as they concern wavelength allocation schemes.

Such a wavelength allocation scheme ensures that at regular intervals $Z_R$ along the fiber, the relative slip between the various channels is substantially equal to a multiple of the bit time. For each channel this can be expressed by the following formula:

$$(k_i \cdot T - T/4) < \delta\tau_i \cdot Z_R < (k_i \cdot T + T/4)$$

where T is the bit time, $k_i$ is an integer that depends on the channel, and $\Delta\tau_i$ is the slip of channel i relative to channel 1. This formula represents the fact that at intervals $Z_R$ the offsets between the various channels caused by slip are integer multiples of the bit time (to within one-fourth of a bit time). This ensures exact or almost exact coincidence of the bit times at intervals of $Z_R$, insofar as the bit times coincide exactly or nearly exactly on transmission. In such a wavelength allocation scheme, modulators can be placed at intervals of $Z_R$, or indeed at shorter intervals, as described in the article by O. Leclerc, or in the patent application filed on the same day as the present application and entitled "Optical fiber transmission systems using soliton signals with wavelength division multiplexing".

The accuracy with which the modulators need to be positioned in such a wavelength allocation scheme in order to ensure proper regeneration of the various channels is about 1% of $Z_R$, as described for example in the article by O. Leclerc, E. Desurvire, and O. Audouin, Robustness of 80 Gbit/s (4×20 Gbit/s) regenerated WDM soliton transoceanic transmission to practical system implementation, published in Optical Fiber Technology, Vol. 3, No. 2, page 117 et seq. (1997). In any event it is shorter than the additional length of optical fiber that is added when making a repair of the type described with reference to FIGS. 1 and 2. As explained above, such a repair technique is therefore not directly applicable to such an optical fiber transmission system using soliton signals with wavelength division multiplexing in which the various wavelengths of the multiplex have been selected in such a manner as to ensure that over a given interval the relative slip between the various channels is substantially equal to a multiple of the bit time.

The invention proposes a solution to this problem. It proposes compensating the effects of slip in the additional length of optical fiber inserted into the transmission system so that the slip to which each channel is subjected because of the repair is substantially equal to a multiple of the bit time.

FIG. 3 shows a first embodiment of repair apparatus of the invention which is referred to as a "jumper". The apparatus of FIG. 3 comprises an amplifier 11, typically an erbium-doped optical fiber amplifier (EDFA) whose input is designed to be connected to the transmission system on one side of the break. The output of the amplifier is connected to one end of an additional length of fiber 13 which is typically a dispersion-shifted fiber (DSF). The other end of the fiber 13 is connected to a demultiplexer 15. At its outputs, the demultiplexer 15 supplies the signals of the various channels $\lambda_1$ to $\lambda_n$ of the multiplex to delays $17_1$ to $17_n$. The delayed signals of the various channels are remultiplexed by a multiplexer 19 whose output is designed to be connected to the transmission system on the other side of the break.

The delays $17_1$ to $17_n$ are selected so that the slip of each channel of the multiplex relative to a reference channel is a multiple of the bit time. This ensures that the relative positions of the bit times of the various channels of the multiplex upstream and downstream of the repair apparatus are the same. In other words, the repair apparatus is transparent from the point of view of the relative positions of the bit times.

By using DSF for the additional length of fiber, it is possible to use the apparatus of the invention for repairing systems with or without dispersion slope compensation (i.e. DSC or non-DSC systems). The slip between channel j and channel k (j>k) in the length of DSF can be written:

$$\Delta\tau_{k,j} = L_R \cdot d'_0 \cdot (\Delta\lambda_{k,j} + 2 \cdot \Delta\lambda_{k,0})/2$$

where:

$L_R$ is the additional length of fiber;

$d'_0$ is the dispersion of the additional length of fiber;

$\Delta\lambda_{k,j}$ is the difference between the wavelengths $\lambda_k$ and $\lambda_j$ of channels k and j; and $\Delta\lambda_{k,0}$ is the difference between the wavelength $\lambda_k$ of channel k and the zero dispersion wavelength in the additional length of fiber.

For a dispersion-compensating transmission system, it is preferable to extract the clock for regeneration purposes from a channel situated in the middle of the spectrum since that is where there are fewest collisions. The reference channel which is not subjected to a time delay $\delta\tau_i$ is thus preferably situated in the middle of the spectrum of the multiplex in a DSC system. This minimizes the number of collisions on the channel which is being used for clock recovery purposes.

When the total number n of channels is odd, it is therefore advantageous to select the time delay $\Delta\tau_i$ induced by the delay $17_i$ as follows:

$\Delta\tau_i = 0$ for channel number i=½(n+1);

$\Delta\tau_i = \Delta\tau_{i,\frac{1}{2}(n+1)}$ for each channel of number i in the range 1 to ½(n−1); and $\Delta\tau_i = T - \Delta\tau_{1/2(n+1),i}$ for each channel of number i in the range (n+3)/2 to n, where T is the bit time.

As a result, the channel of number ½(n+1) is subjected to no delay. Each channel of number i less than ½(n+1) is subjected to a delay corresponding to channel number ½(n+1) slipping relative to channel number i in such a manner as to present a bit time that is synchronous with the reference channel. Each channel of number i greater than ½(n+1) is subjected to a delay such that its slip relative to channel number ½(n+1) is equal to the bit time.

In analogous manner, when the total number n of channels is even, then it is advantageous for the time delay $\Delta\tau_i$ induced by delay $17_i$ to be selected as follows:

$\Delta\tau_i = 0$ for channel number i=½n;

$\Delta\tau_i = \Delta\tau_{i,\frac{1}{2}n}$ for each channel of number i lying in the range 1 to ½n−1; and $\Delta\tau_i = T - \Delta\tau_{1/2 n,i}$ for each channel of number i in the range ½n+1 to n, where T is the bit time.

As a result, channel number ½n is subject to no delay. Each channel of number i less than ½n is subjected to a time delay corresponding to channel number ½n slipping relative to the channel of number i so as to present a bit time that is synchronous with the reference channel. Each channel of number greater than ½n is subjected to a time delay such that its slip relative to channel number ½n is equal to the bit time.

For a transmission system without dispersion compensation, the clock for regeneration purposes is preferably extracted from a channel situated at the beginning of the spectrum, since such a channel is subjected to the fewest collisions. The reference channel is subjected to no time delay $\Delta\tau_i$ is thus preferably situated at the beginning of the multiplexed spectrum. This minimizes the number of collisions on the channel which is used for clock recovery purposes.

The time delay $\Delta\tau_i$ induced by the delay $17_i$ is advantageously selected as follows:

$\Delta\tau_i=0$ for channel number i=1;

$\Delta\tau_i=T-\Delta\tau_{1,i}$ for each channel of number i other than 1.

As a result, channel number 1 is subjected to no delay and the other channels are subjected to respective time delays that ensure that their slip relative to channel number 1 is equal to the bit time.

Advantageously, the apparatus of the present invention is provided in ready-to-use form with determined additional lengths of optical fiber. By way of example, the additional length of fiber may be 2.5 km, 5 km, 8 km, and 11 km corresponding respectively to depths of 1.3 km, 3 km, 5 km, and 7 km.

Naturally, the present invention is not limited to the embodiments described above and shown, and numerous variants can be applied thereto by the person skilled in the art. Thus, the relative positions of the amplifier, of the length of the fiber, and of the various delays can all be varied. It is not always necessary to use an amplifier.

The wavelength allocation scheme is not limited in any way to the examples described. It should also be observed that compared with the embodiments described, it is possible to add or remove filters or amplifiers as may be required. Finally, the invention is described above for one-way transmission. Clearly it can also be applied to both-way transmission.

What is claimed is:

1. A method of repairing an optical fiber transmission system using soliton signals and wavelength division multiplexing, in which the various wavelengths, $\Delta_1$ to $\Delta\tau_n$ of the multiplex are selected to ensure that over a given interval $Z_R$, the relative slip between the various channels is substantially equal to a multiple of the bit time, the method comprising the following steps:

inserting an additional length of optical fiber in the transmission system; and compensating for the effects of said additional length on the relative slip between the various channels of the multiplex.

2. A method according to claim 1, wherein the compensation step comprises applying time delays, $\Delta\tau_1$ to $\Delta\tau_n$, to the various channels of the multiplex so that the slip of each channel of the multiplex relative to a reference channel is substantially equal to a multiple of the bit time.

3. A method according to claim 2, wherein the transmission system is a transmission system without slope-dispersion compensation, and wherein the reference channel is selected to be at the beginning of the wavelength spectrum of the multiplex.

4. A method according to claim 3, comprising applying to each channel of wavelength longer than that of the reference channel a time delay equal to the difference between the bit time and the slip of said channel relative to the reference channel.

5. A method according to claim 1, wherein the compensation step comprises applying a zero time delay to a reference channel and in applying time delays, $\Delta\tau_1$ to $\Delta\tau_n$, to the other channels of the multiplex so that the slip of each of the other channels of the multiplex relative to the reference channel is substantially equal to zero or to the bit time.

6. A method according to claim 5, wherein the transmission system is a transmission system with slope-dispersion compensation, and wherein the reference channel is selected to be in the middle of the wavelength spectrum of the multiplex.

7. A method according to claim 6, comprising applying to each channel of wavelength shorter than that of the reference channel a time delay that is equal to the slip of the reference channel relative to said channel.

8. A method according to claim 6, comprising applying to each channel of wavelength longer than that of the reference channel a time delay equal to the difference between the bit time and the slip of said channel relative to the reference channel.

9. A method according to claim 1, wherein said additional length of optical fiber is constituted by a dispersion-shifted optical fiber.

10. A method according to claim 1, further including a step of amplifying the multiplex signals.

11. A method according to claim 1, wherein for each wavelength $\lambda_i$ of the multiplex, and for an interval $Z_R$, the difference $\delta\tau_i$ between the slip per unit length on channel i and on the first channel satisfies the following relationship:

$$(k_i \cdot T - T/4) < \delta\tau_i \cdot Z_R < (k_i \cdot T + T/4)$$

where $k_i$ is an integer depending on the channel.

12. Apparatus for repairing an optical fiber transmission system using soliton signals with wavelength division multiplexing in which the various wavelengths, $\lambda_1$ to $\lambda_n$, of the multiplex are selected so as to ensure that the relative slip between the various channels over a given interval, $Z_R$, is substantially equal to a multiple of the bit time, the apparatus comprising:

an additional length of optical fiber in the transmission system; and means for compensating the effects of said additional length on the relative slip between the various channels of the multiplex.

13. Apparatus according to claim 12, wherein the compensation means comprise demultiplexing means, means for applying time delays $\Delta\tau_1$ to $\Delta\tau_n$ to the various channels of the multiplex, and remultiplexing means.

14. Apparatus according to claim 12, wherein the compensation means comprise means for applying time delays $\Delta\tau_1$ to $\Delta\tau_n$ to the various channels of the multiplex, said time delays being selected so that the slip of each of the channels of the multiplex relative to a reference channel is substantially equal to a multiple of the bit time.

15. Apparatus according to claim 12, wherein the compensation means comprise means for applying a zero delay to a reference channel and for applying time delays $\Delta\tau_1$ to $\Delta\tau_n$ to the other channels of the multiplex so that the slip of each of the other channels of the multiplex relative to the reference channel is substantially equal to zero or to the bit time.

16. Apparatus according to claim 15, wherein the reference channel is selected to be in the middle of the wavelength spectrum of the multiplex.

17. Apparatus according to claim 16, wherein the time delay of each channel of wavelength shorter than that of the reference channel is equal to the slip of the reference channel relative to said channel in the additional length of optical fiber.

18. Apparatus according to claim 16, wherein the time delay of each channel of wavelength longer than that of the reference channel is equal to the difference between the bit time and the slip of said channel relative to the reference channel in the additional length of optical fiber.

19. Apparatus according to claim 15, wherein the reference channel is selected to be at the beginning of the wavelength spectrum of the multiplex.

20. Apparatus according to claim 19, wherein the time delay of each channel of wavelength longer than that of the reference channel is equal to the difference between the bit time and the slip of said channel relative to the reference channel in the additional length of optical fiber.

21. Apparatus according to claim 12, wherein said additional length of optical fiber is constituted by a dispersion-shifted optical fiber.

22. Apparatus according to claim 12, further including means for amplifying the signals of the multiplex.

* * * * *